United States Patent
Barthel et al.

(10) Patent No.: US 11,307,552 B2
(45) Date of Patent: Apr. 19, 2022

(54) METHOD FOR MODIFYING A CONFIGURATION AND INDUSTRIAL PLANT SYSTEM

(71) Applicants: Herbert Barthel, Herzogenaurach (DE); David Ferenczi, Graz (AT); Wolfgang Schmauss, Rückersdorf (DE); Maximilian Walter, Nuremberg (DE)

(72) Inventors: Herbert Barthel, Herzogenaurach (DE); David Ferenczi, Graz (AT); Wolfgang Schmauss, Rückersdorf (DE); Maximilian Walter, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 457 days.

(21) Appl. No.: 16/513,688

(22) Filed: Jul. 16, 2019

(65) Prior Publication Data

US 2020/0026254 A1 Jan. 23, 2020

(30) Foreign Application Priority Data

Jul. 17, 2018 (EP) ..................... 8183956

(51) Int. Cl.
*G06F 11/00* (2006.01)
*G05B 19/042* (2006.01)
(Continued)

(52) U.S. Cl.
CPC ..... *G05B 19/0428* (2013.01); *G05B 19/4061* (2013.01); *G06F 11/1004* (2013.01);
(Continued)

(58) Field of Classification Search
CPC ............ G05B 19/0428; G05B 19/4061; G05B 2219/24192; G05B 2219/14014;
(Continued)

(56) References Cited

U.S. PATENT DOCUMENTS

| 6,445,965 B1 | 9/2002 | Muehlbauer |
| 2007/0176732 A1* | 8/2007 | Humpert .............. G05B 19/058 340/3.44 |

(Continued)

FOREIGN PATENT DOCUMENTS

| DE | 19818181 A1 | 10/1999 |
| EP | 2814193 B1 | 11/2016 |

OTHER PUBLICATIONS

European Search Report for corresponding Application No. 18183956.4-1205 filed Dec. 14, 2018.

*Primary Examiner* — Albert Decady
*Assistant Examiner* — Enamul M Kabir
(74) *Attorney, Agent, or Firm* — Lempia Summerfield Katz LLC

(57) ABSTRACT

In order to enable a seamless configuration modification during operation, a first automation device sends a second automation device a request for parameter modification. The second automation device responds to the request, such that a standby acknowledgement of the request is sent. Immediately with the transmission of the standby acknowledgement in the second automation device, an output process image is frozen, and the modification of the communication parameters for the second automation device is carried out. The first automation device responds, such that after receiving the standby acknowledgement in the first automation device, the communication is immediately stopped and the (Continued)

modification of the communication parameters is carried out for the first automation device. An input process image is frozen.

11 Claims, 6 Drawing Sheets

(51) Int. Cl.
G05B 19/4061 (2006.01)
G06F 11/10 (2006.01)
H04L 1/00 (2006.01)
(52) U.S. Cl.
CPC .......... H04L 1/0046 (2013.01); H04L 1/0061 (2013.01); *G05B 2219/24192* (2013.01)
(58) Field of Classification Search
CPC ........... G05B 2219/24179; G05B 2219/31103; G05B 19/4185; G05B 19/0421; G05B 19/052; G05B 2219/33139; G06F 11/1004; H04L 1/0046; H04L 1/0061; H04L 41/0813; H04L 12/462; H04L 9/3247; Y02P 90/02
See application file for complete search history.

(56) References Cited

U.S. PATENT DOCUMENTS

| | | | |
|---|---|---|---|
| 2013/0031037 A1* | 1/2013 | Brandt | G06N 20/00 706/12 |
| 2014/0082312 A1 | 3/2014 | Schüepp | |
| 2014/0173472 A1* | 6/2014 | McGreevy | G05B 19/409 715/763 |
| 2014/0372840 A1 | 12/2014 | Barthel | |
| 2017/0164219 A1* | 6/2017 | Huang | H04W 16/32 |
| 2020/0021781 A1* | 1/2020 | Al-Salem | H04L 63/1433 |

* cited by examiner

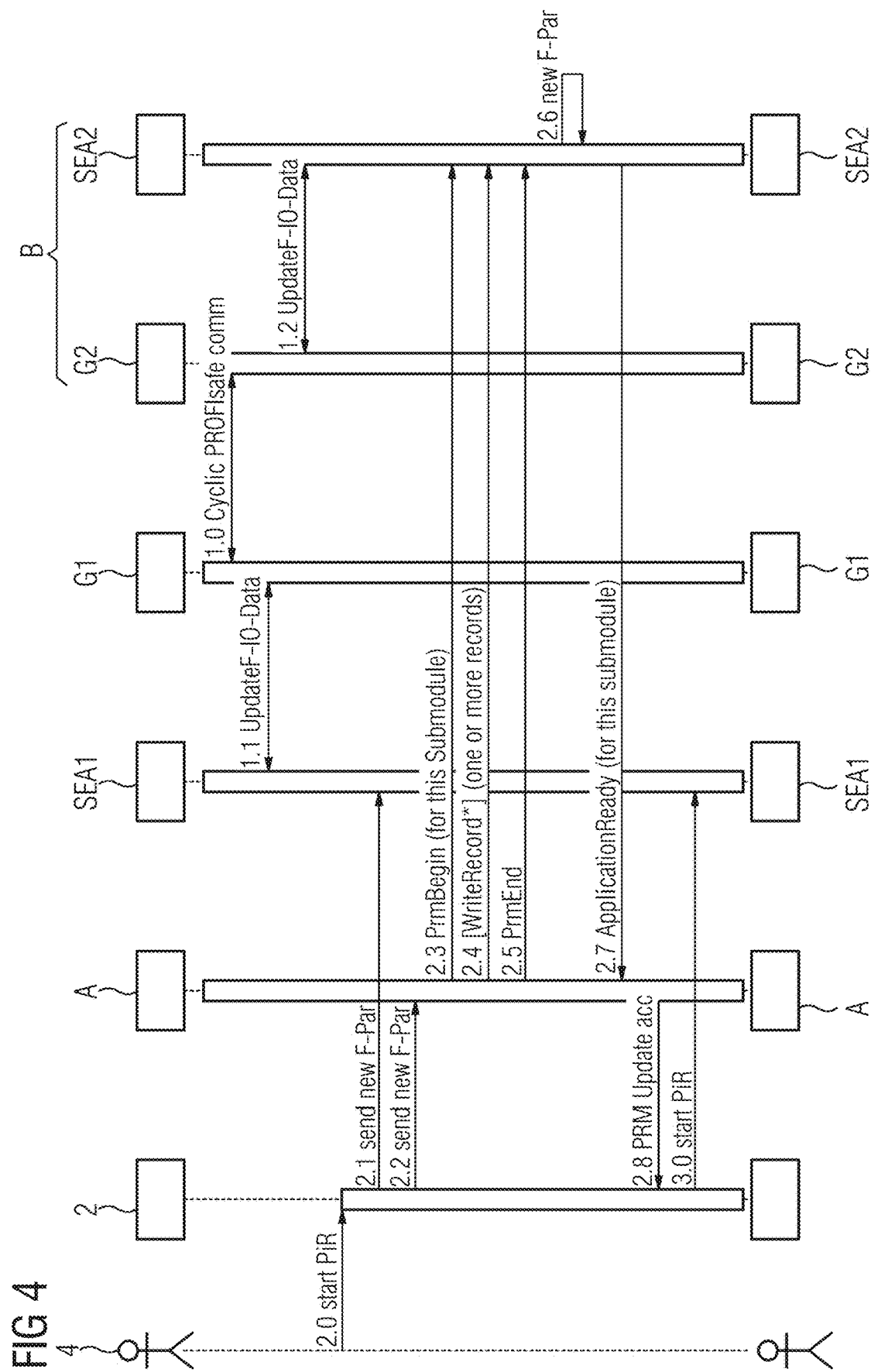

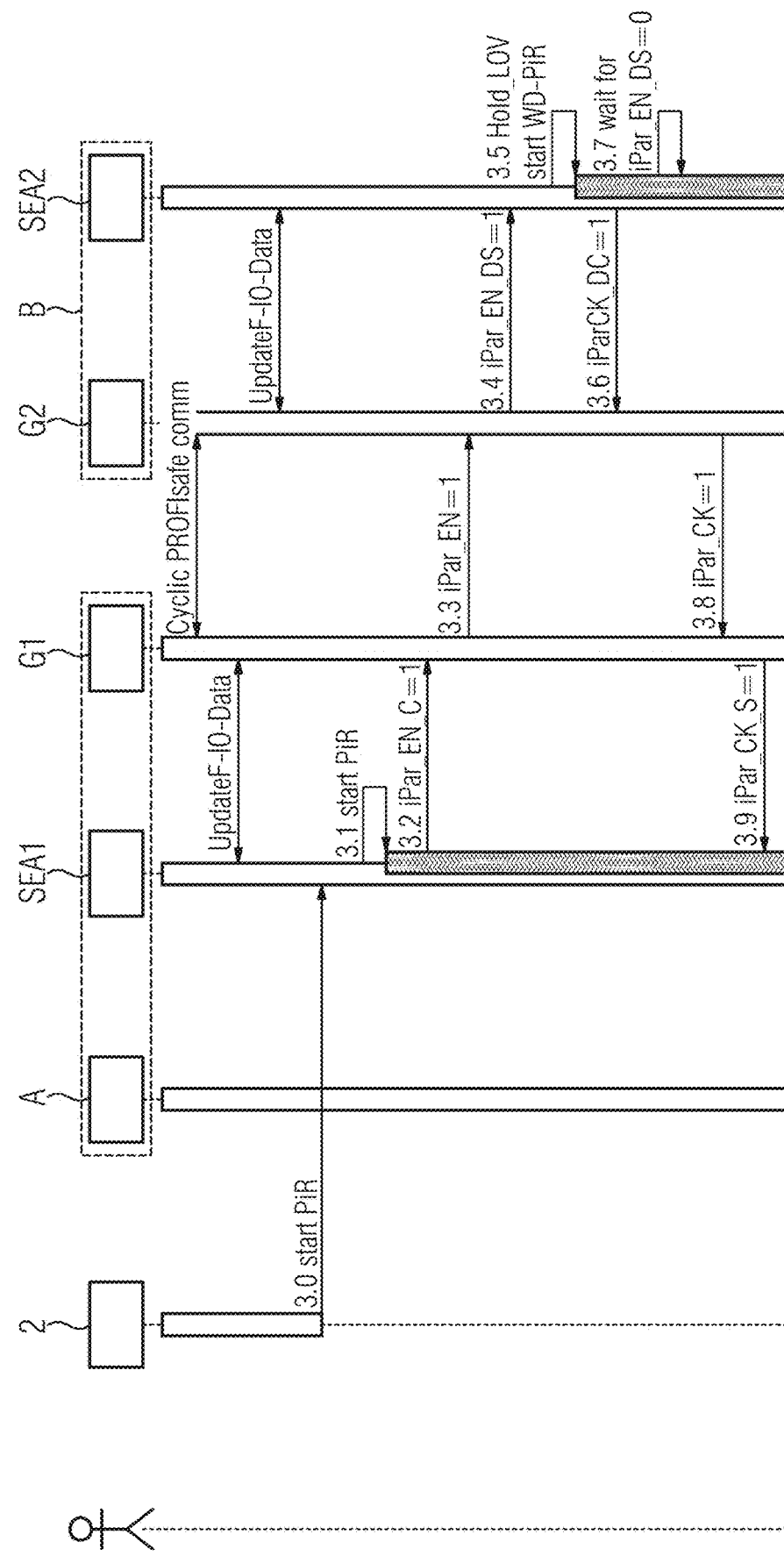

METHOD FOR MODIFYING A CONFIGURATION AND INDUSTRIAL PLANT SYSTEM

This application claims the benefit of EP 18183956.4, filed on Jul. 17, 2018, which is hereby incorporated by reference in its entirety.

BACKGROUND

The present embodiments relate to modifying a configuration of communication parameters in a communication link designed for functional safety between a first automation device and a second automation device.

The present embodiments relate to the technical field of functionally safe communication, which, inter alia, is used in the communication between field devices, control components, and similar facilities in industrial process automation or in manufacturing automation. Such a functionally safe communication is also referred to as F-communication and is used, for example, in safety-related applications (e.g., if errors in communication may lead to endangering persons or property).

With such a functionally safe communication link, for example, during operation of an industrial plant, an uninterruptible plant operation also plays a decisive role in modifying a configuration on devices and networks or when adding, removing, or exchanging devices or individual modules.

Configuration modifications during operation, also known as "change parameter in run" measures (PiR), are to be carried out seamlessly and are not to affect communication in the network. A continuous production operation may thus be provided without a plant shutdown.

The European patent EP 2 814 193 B1 entitled "Method and system for identifying faults in the transmission of data from a transmitter to at least one receiver" concerns functionally safe communication; a solution for a seamless reparameterization in a functionally safe connection is not shown in EP 2 814 193 B1, however.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a reparameterization or a configuration modification of communication parameters is enabled in a communication link configured for functional safety during operation as far as possible without an interruption or changeover collision for the plant process.

In one or more of the present embodiments, a first automation device sends a request for a parameter modification to a second automation device. The second automation device responds to the request such that a standby acknowledgment of the request is sent. In the process, an output process image is immediately frozen with a transmission of a standby acknowledgment in the second automation device. As a result of this, the process output data finally output to the second automation device is kept at a last value, and the modification of the communication parameters for the second automation device is carried out. Further, the first automation device responds such that after receiving the standby acknowledgment in the first automation device, the communication is immediately stopped, and the modification of the communication parameters is carried out for the first automation device. An input process image is frozen. As a result of this, the process input data finally present on the first automation device is kept at a last value. When the modification of the communication parameters in the first automation device is concluded, this restarts the communication and sends new process output data as an output process image to the second automation device. As a result of this, the process output data output finally on the second automation device is replaced by updated process output data.

A Profisafe protocol for a Profinet link is used for the safety protocol within one or more of the present embodiments, for example. The functionally safe protocol Profisafe may then be implemented in the transmit-receive applications and in the device drivers.

The quickest possible implementation of a two-sided reparameterization and a restart of a functionally safe communication stack is advantageously achieved. In the first automation device, the reparameterization is started immediately, as soon as the first automation device has identified an acknowledgment of a "parameter modification" request. The second automation device likewise begins with the reparameterization immediately if the second automation device has generated the acknowledgment "parameter modification", although the second automation device does not yet know when the first automation device detects or receives this acknowledgment. In the process, the second automation device leaves a process image unmodified until the first automaton device sends new process output data as an output process image to the second automation device.

In a further embodiment of the method, the transmission of the standby acknowledgment starts a first timer with a first runtime in the second transmit-receive application. The first timer is used to monitor whether, within the first runtime, the communication has been restarted again by the automation device. As a result, new process output data has been sent as a new output process image to the second automation device. If this is the case, then the second automation device responds with a ready acknowledgment and stops the first timer. The time monitoring in the first timer is used as a watchdog, and if the ready acknowledgment does not arrive at the first runtime of the first timer, an error is produced and safe replacement values are provided, for example, or a safe state is assumed.

In order to further improve safety, following receipt of the ready-acknowledgment in the first automation device, a second timer with a second runtime is started in the first transmit-receive application, and the second timer is used to monitor whether the ready acknowledgment has been received within the second runtime. The time monitoring also serves as a watchdog function, and if the timer elapses before the ready acknowledgment occurs, an error response is generated and/or replacement values are provided.

In one embodiment, the ready acknowledgment simultaneously includes new process input data as the new input process image for the first automation device.

A significant advantage is considered to be that the method is used to carry out the configuration modifications in an industrial plant system for controlling the safety-critical process according to the afore-cited solution features, where as a result, an uninterruptible plant operation is enabled during the configuration modification.

A further measure that increases the communication safety is considered to be that, after the restart of the communication in addition to the sent new process output data, a signature is formed via the new communication parameters. This signature is additionally sent to the second automation device, and in the second automation device, the sent signature is compared with a signature formed in the second automation device via the new communication parameters. If the comparison is positive, then the process image is modified; if the comparison is negative, a safety action is introduced (e.g., on the other hand, if it remains thus or a safety action is introduced because, on account of a modified signature, a transmission error has possibly been identified).

In one or more of the present embodiments, an industrial plant system includes the first automation device embodied to obtain a request for parameter modification from the configuration system and send the request to the second automation device for parameter modification purposes. In the process, the second automation device is embodied to respond to the request such that a standby acknowledgment of the request is sent. Further, the second automation device is embodied to immediately freeze an output process image at the time instant of transmitting the standby acknowledgment. As a result of this, the process output data output finally to the second automation device is kept at a last value in order to trigger the modification of the communication parameters for the second automation device. Further, the first automation device is embodied, after receiving the standby acknowledgment in the first automation device, to immediately halt the communication and to carry out the modification of the communication parameters for the first automation device. The first automation device is further embodied to freeze a first input process image. As a result of this, the process input data finally present on the first automation device is kept at a value. Further, after concluding the modification of the communication parameters in the first automation device, the first automation device is embodied to reestablish the communication and to send new output data as an output process image to the second automation device.

An engineering system (e.g., an engineering system from the company Siemens AG with the name "TIA Portal") is used, for example, as the configuration system. Functionally safe modules may be parameterized and configured using this engineering system. For example, F parameters, such as an F monitoring time, an F target address, a behavior according to channel errors, or an F-peripheral DB number, are parameterized or set, for example, in the region of the communication parameters.

An advantage is considered to be that during operation of a plant, a parameterization may take place, and a seamless reparameterization of the communication link is thus enabled. The processing of the parameter modification in the two automation devices plays a significant role. In accordance with one or more of the present embodiments, this processing may begin significantly earlier than is known in the prior art. Further, a software-related implementation of the new method is easier than in the prior art.

In one or more of the present embodiments, the plant system is embodied such that the second transmit-receive application has a first timer and is embodied at the time instant of transmitting the standby acknowledgment to start the first timer and to monitor whether the communication has been restarted by the first automation device within a first runtime.

The first transmit-receive application has a second timer, and is embodied, at the time instant of receiving the standby acknowledgment, to start the second timer and to monitor whether a ready acknowledgment is received within a second runtime. The first automation device or the first transmit-receive application is also embodied, after the restart of the communication, in addition to the sent new process output data, to form a signature via the new communication parameters. This signature is additionally sent to the second automation device. In the second automation device, the sent signature is compared with a second signature formed in the second automation device via the new communication parameters. Accordingly, the second transmit-receive application is embodied for this comparison, and on account of the knowledge of the new communication parameters and the formation of a second signature, may generate an expectation with respect to the new parameters. Should the expectation not match, an error response is generated.

BRIEF DESCRIPTION OF THE DRAWINGS

According to the drawing, an exemplary embodiment of the invention is presented, in which:

FIG. 4 shows an exemplary sequence flow for introducing a configuration modification during operation; and FIGS. 5A-5B show an exemplary sequence flow for configuration modification during operation with detailed acknowledgment events.

DETAILED DESCRIPTION

Figure 1:
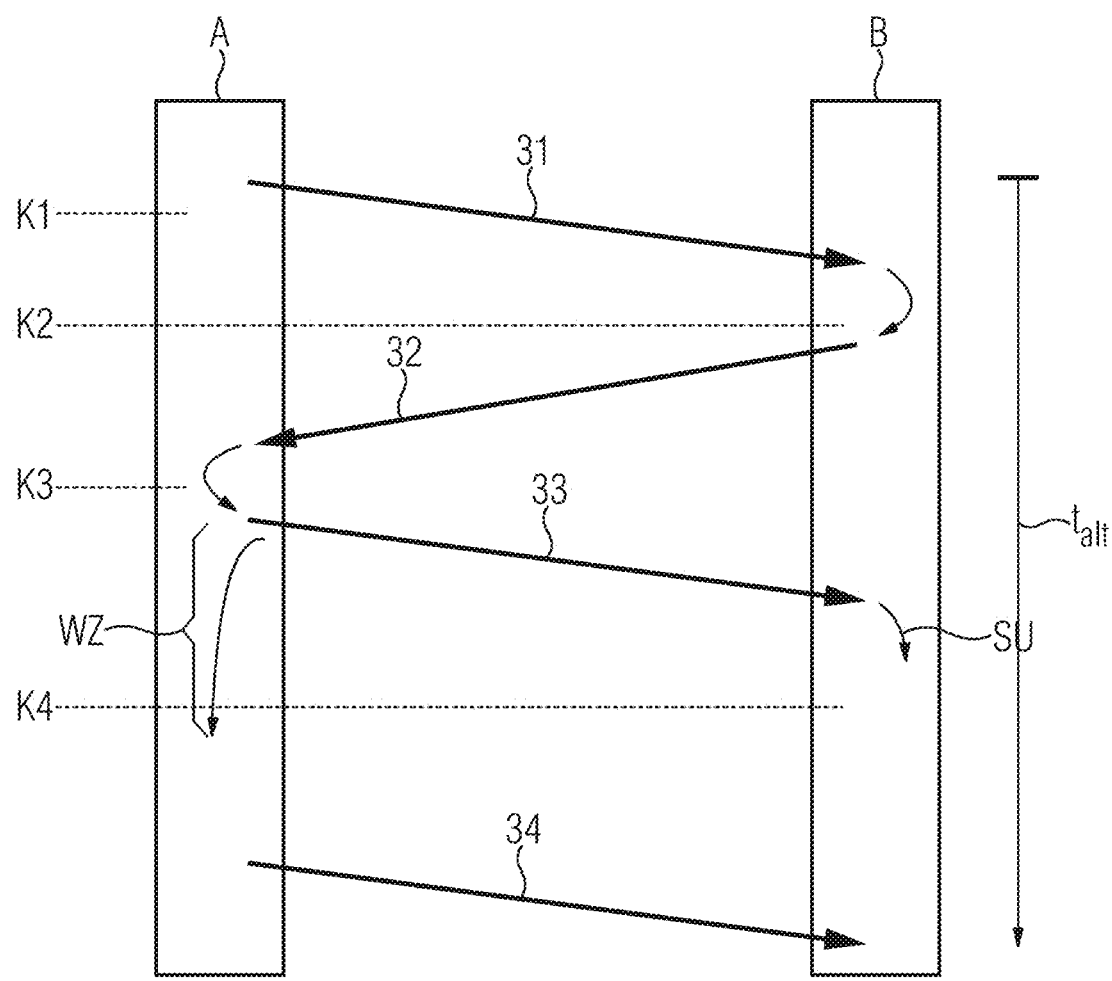
FIG. 1 shows a process flow for communication modification of communication parameters according to the prior art.

According to FIG. 1, a main process flow is shown for a configuration modification between a first automation device A and a second automation device B according to the prior art. A first knowledge level K1, a second knowledge level K2, a third knowledge level K3, and a fourth knowledge level K4 are shown with dashed lines. In the first knowledge level K1, the first automation device A knows that a message has been sent and that the first automation device A wants to reparameterize. In the second knowledge level K2, the second automation device B knows that the first automation device A intends to reparameterize. In the third knowledge level K3, the first automation device A knows that the second automation device B has received the message that the first automation device A wants to reparameterize. In the fourth knowledge level K4, the second automation device B knows that the first automation device A knows that the second automation device B has received the message that the first automation device A wants to reparameterize.

The first automation device A sends a request 31 for parameter modification to the second automation device B. The second automation device B responds thereto with the transmission of a standby acknowledgement 32. The first automation device A sends an acknowledgment 33, and after receiving the acknowledgment 33 in the automation device A, the action start of the reparameterization SU is carried out. A waiting time WZ is started in the first automation device A with the transmission of the acknowledgment 33. After the waiting time WZ has elapsed, a new connection set-up 34 is carried out between the first automation device A and the second automation device B. A previous reparameterization time $t_{old}$ runs from the transmission of the request 31 to the receiving of the new connection set-up 34 and is too long for the desired seamless reparameterization during plant operation.

Figure 2:
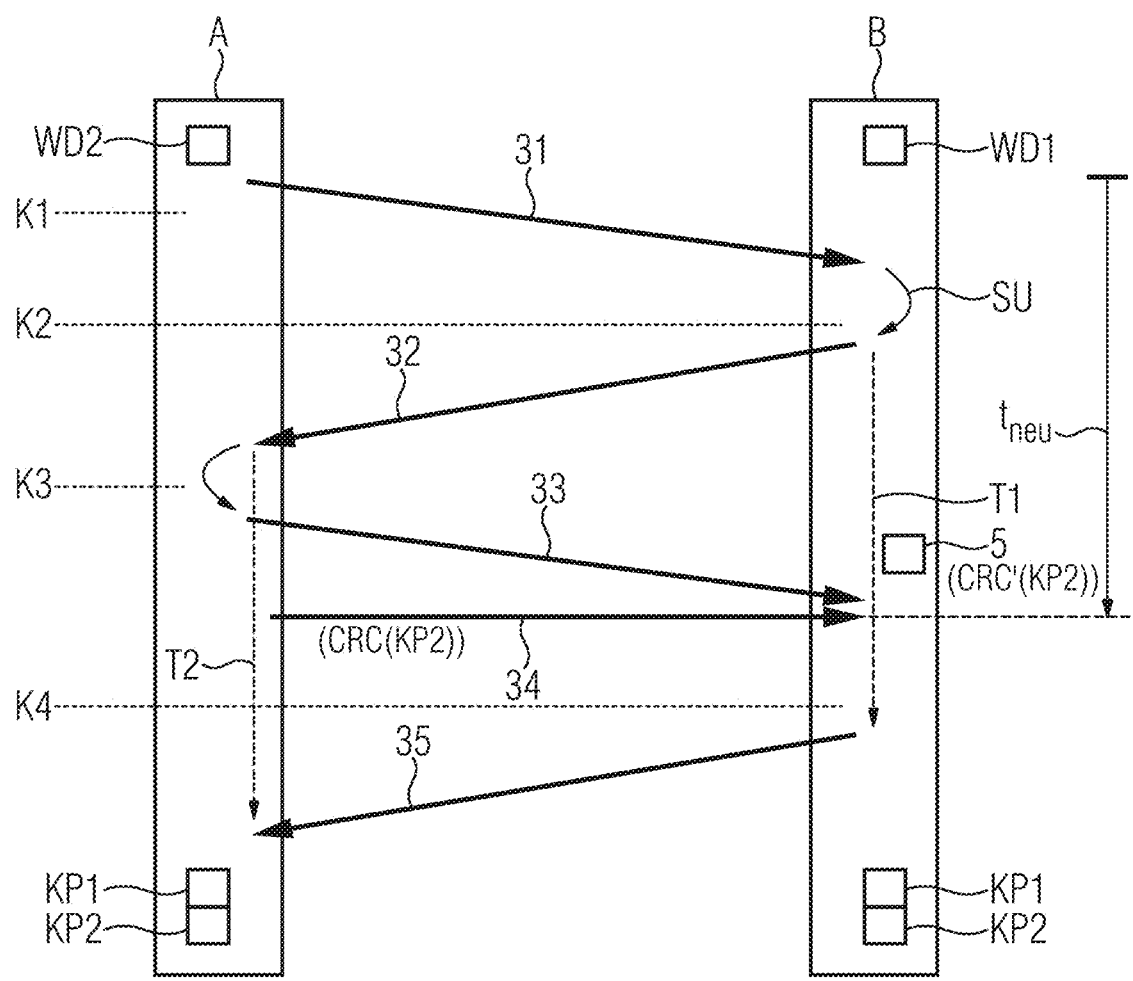
FIG. 2 shows a process flow according to an embodiment.

According to FIG. 2, it is now shown that according to one or more of the present embodiments, the previous reparameterization time $t_{old}$ may be converted into an improved, new shortened reparameterization time $t_{new}$. The previous fixedly set waiting time WZ (see FIG. 1) is now obsolete. With the method for modifying configurations of communication parameters KP1 in a communication link 1, 1' configured for functional safety (see FIG. 3) between the first automation device A and the second automation device B, the first automation device A sends a request 31 for parameter modification to the second automation device B, and the second automation device B responds to the request 31 with a standby acknowledgment 32.

An output process image is frozen immediately with the transmission of the standby acknowledge 32 in the second automation device B. As a result of this, the process output data OV finally output on the second automation device B is kept at a last value. The modification of the communication parameters from the first communication parameters KP1 to the second communication parameters KP2 is now carried out for the second automation device B. The first automation device A now begins, after receiving the standby acknowledgement 32 in the first automation device A, to immediately halt the communication and to carry out the modification of the communication parameters KP2 for the first automation device A. In this case, an input process image is likewise frozen in the first automation device A. As a result of this, the process input data IV finally present on the first automation device A is kept at a last value. If the modification of the communication parameters from KP1 to KP2 is concluded in the first automation device A, this reestablishes the communication. A new connection set-up 34 is established. New process output data OV is sent as an output process image to the second automation device B. As a result of this, the process output data OV output finally on the second automation device B is replaced by updated process output data OV. A comparison between FIG. 1 and FIG. 2 with the times for the reparameterization is produced in that the shortened reparameterization $t_{new}$ now requires less time than the previous reparameterization time $t_{old}$. As a result of this, a reparameterization in runtime may take place seamlessly.

By adding watchdog functionalities in the form of a first timer WD1 and a second timer WD2, the functional safety is further increased. With the transmission of the standby acknowledgment 32, a first timer WD1 with a first runtime T1 is started in the second transmit-receive application SEA2, and the first timer WD1 is used to monitor whether the communication by the first automation device A has been restarted within the first runtime T1. As a result, new process output data OV has been sent as a new output process image to the second automation device B. I If this is the case, the second automation device B then responds with a ready acknowledgment 35 and stops the first timer WD1.

After receiving the standby acknowledgment 32 in the first automation device A, a second timer WD2 is started with a second runtime T2 in the first transmit-receive application SEA1, and the second timer WD2 is used to monitor whether the standby acknowledgment 35 has been received within the second runtime T2.

After the restart of the communication link 34, in addition to the sent new process output data OV, a signature CRC is formed via the new communication parameters, KP2 and this signature CRC is additionally sent to the second automation device B. In the second automation device B, the sent signature CRC is compared with a second signature CRC' formed in the second automation device B by way of the new communication parameters KP2. If the comparison is positive, then the process image is modified; if the comparison is negative, a safety action is introduced or safe replacement values are provided, because an error has been identified.

As a result of the communication parameters KP2 to be modified having already been communicated to the second automation device B in advance, a second signature CRC' may likewise form per se by way of the second communication parameters KP2, so that an expectation has in effect been generated; when this does not correspond to the sent signature CRC of the second communication parameters KP2 from the first automation device A, an error must have occurred.

Figure 3:
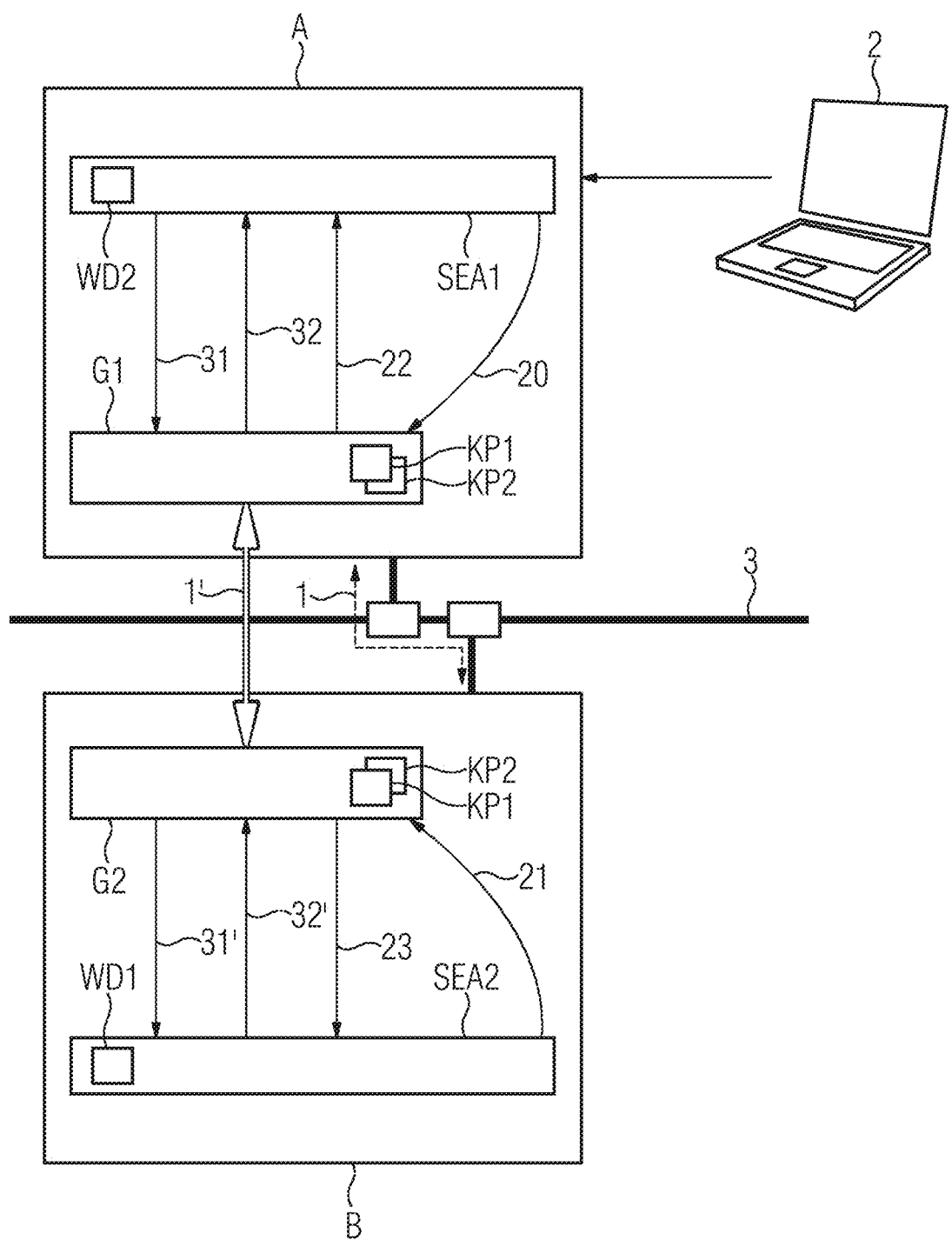
FIG. 3 shows a first automation device and a second automation device with a connected configuration system according to an embodiment.

According to FIG. 3, an overview is shown in the form of a block diagram. Via a configuration system 2, communication parameters may be exchanged during operation. The configuration system 2 is connected to the first automation device A and sends a request (see also FIG. 4) for parameter modification to the first automation device A. The first automation device A and the second automation device B are connected to one another via a field bus 3.

The first automation device A has a first transmit-receive application SEA1 and a first device driver G1. The second automation device B has a second transmit-receive application SEA2 and a second device driver G2. The configuration system 2 connected to the first automation device A is embodied to configure the respective transmit-receive applications SEA1, SEA2 and the respective device drivers G1, G2 with a first set of configuration parameters KP1 and for a modification to configure the respective transmit-receive applications SEA1, SEA2 and the respective device drivers G1, G2 with a second set of configuration parameters KP2.

The first automation device A is embodied to obtain a request 31 for parameter modification from the configuration system 2, and to send this to the second automation device B for parameter modification purposes. The second automation device B is embodied to respond to the request 31 such that a standby acknowledgment 32 of the request 31 is sent.

For reparameterization, the second automation device B is embodied to immediately freeze an output process image at the point in time of transmitting the ready acknowledgment 32'. As a result of this, the process output data OV finally output on the second automation device B is kept at a last value. The configuration parameters are now modified from KP1 to KP2.

The first automation device A is embodied, after receiving the standby acknowledgment 32 or 32' in the first automation device A, to immediately halt the communication and to trigger the modification in the communication parameters from KP1 to KP2. In this case, the input process image is frozen. As a result of this, the process input data IV finally present at the first automation device A is kept at a last value. After the modification in the communication parameters KP2 in the first automation device A has concluded, the communication is restarted, and new process output data OV is sent to the second automation device B. For a watchdog functionality, the first automation device A has a second timer WD2, and the second automation device B has a first timer WD1.

With FIG. 4, a flow sequence of telegrams and requests between the first automation device A and the second automation device B is illustrated for a configuration modification during operation or for a parameter modification in runtime (PiR). A user 4 triggers a start of a parameter modification via the configuration system 2 with the command Start_PiR 2.0. Thereupon, new F parameters are sent to the first automation device A and to the first transmit-receive application SEA1, send_new F-Par 2.1 send_new F-Par 2.2. The first automation device A now knows that the first automation device A should be reparameterized and sends a command PrmBegin (for this submodul) 2.3 to the second automation device B (e.g., to the second receive application SEA2). A new data set is also sent Write_Record (e.g., one or more records) 2.4, and then, the command PrmEnd 2.5 is established.

The second automation device B or the second transmit-receive application SEA2 then responds with the knowledge New_F-Par 2.6 and sends a command Application_Ready (for this submodul) 2.7 back to the first automation device A. The first automation device A sends a command PRM_Update accepted 2.8 to the configuration system 2. This may now trigger the actual start PiR 3.0 of the reparameterization. The process of reparameterization start PiR 3.0 is explained in detail with FIG. 5.

Figure 5B:
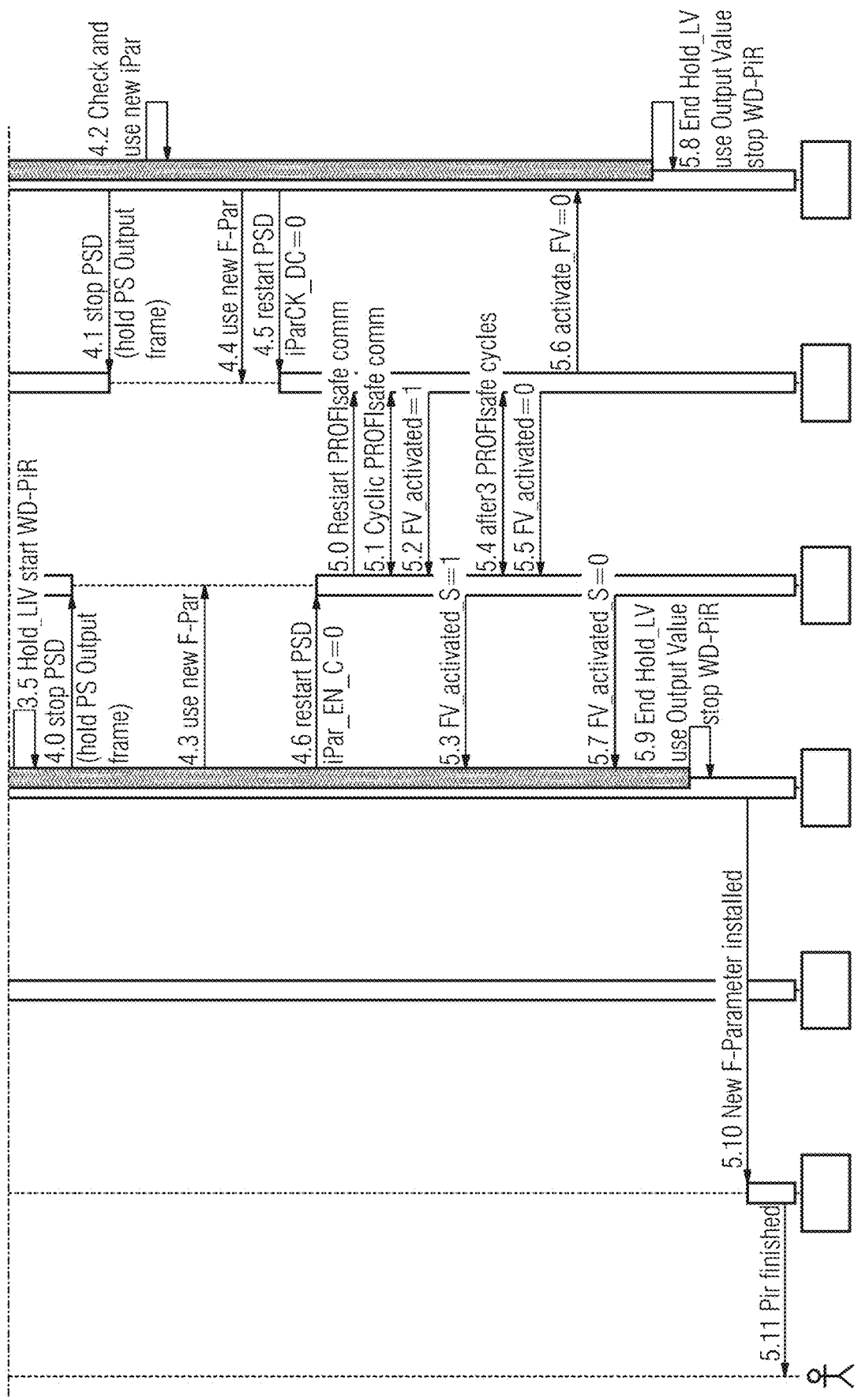

FIG. 5 shows how the reparameterization after the start command Start PIR 3.0 proceeds using the configuration system 2.

The first automation device A is shown with a dashed line and shows the combination of the first transmit-receive application SEA1 and the first device driver G1. The second automation device A is likewise shown with a dashed line and shows the second transmit-receive application SEA1 and the second device driver G2. The first automation device A and the first transmit-receive application SEA1 now receive the start command for the reparameterization start PiR 3.0 and thus respond internally with a response start PiR 3.1, whereupon the command iPar_EN_C=1 3.2 is sent. This provides that a parameter modification is now enabled. This is forwarded again by the first device driver G1 by the command iPar_EN=1 3.1, and the ability or command for enabling the parameter modification is forwarded to the second device driver G2 of the second automation device B. The second device driver G2 internally informs the second transmit-receive application SEA2 about the parameter modification with the command iPAR_EN_DS=1 3.4. Now, the second transmit-receive application SEA2 triggers the freezing of the process output values OV with the command Hold_LOV Start WD-PiR 3.5. The second transmit-receive application acknowledges this with iPar_OK_DC=1 3.6. The start WD-PiR command starts the first timer WD1.

The second transmit-receive application SEA2 responds with an acknowledgment of the possibility of reparameterization iPar_EN_DE=1 with iPar_OK_DC=1 3.6. The second automation device B now stays in a waiting state Wait for iPar_EN_DS=0 3.7.

The second device driver G2 sends an iPar_OK=1 3.8 to the first device driver G1. The first device driver G1 thereupon responds with a transmit command to the first transmit-receive application SEA1 and sends this iPar=OK_S=1 3.9. From here on, the process input values IV are started with the command Hold Load Input-Value (LIV) or use FV and start WD-PiR 3.10. The second timer W2 is now started for the monitoring time explained with FIG. 2.

With a command Stop PSD, the Profisafe driver PSD is stopped and the Profisafe communication is therefore likewise stopped. The Profisafe driver is also stopped on the side of the second automation device B with the command Stop PSD 4.1 and also on the side in the second device driver G2. The check for new parameters and the use of the new parameters with the command Check and use new iPar 4.2 may now be carried out on the side of the second automation device B. The new configuration parameters are likewise used on the side of the first automation device A with the command Use new F-Pair 4.3. On both sides (e.g., on the side of the first automation device A and on the side of the second automation device B), the respective Profisafe driver may now be restarted. This takes place on the side of the second automation device B with the command Restart PSD, iParOK_DE=0 4.5 and on the side of the first automation device A with the command Restart PSD, iPar_EN_C=0 4.6.

Then, starting from the side of the first automation device A, a connection restart is carried out with the command Restart PROFIsafe comm 5.0. The side of the second automation device B responds with a cyclical Profisafe Communication Cyclic PROFIsafe comm 5.1. In the event that replacement values (e.g., error values FV) have been used, these now are reset with the command FV_activated=0. This takes place with 5.6 on the side of the second automation device B and with 5.7 on the side of the first automation device A. The new values in the cyclical communication are then integrated again with the command End Hold_LV use Input-Value stop WD-PiR 5.9, and the notification New F-Parameter installed 5.10 is then given to the user 4 via the configuration system 2. The reparameterization in runtime is thus ended with PiR finished 5.11.

In FIG. 4 and FIG. 5, the reparameterization is carried out seamlessly between the cyclical communication, as above, for example, in FIG. 4, with 1.0, 1.2 and 1.1.

The elements and features recited in the appended claims may be combined in different ways to produce new claims that likewise fall within the scope of the present invention. Thus, whereas the dependent claims appended below depend from only a single independent or dependent claim, it is to be understood that these dependent claims may, alternatively, be made to depend in the alternative from any preceding or following claim, whether independent or dependent. Such new combinations are to be understood as forming a part of the present specification.

While the present invention has been described above by reference to various embodiments, it should be understood that many changes and modifications can be made to the described embodiments. It is therefore intended that the foregoing description be regarded as illustrative rather than limiting, and that it be understood that all equivalents and/or combinations of embodiments are intended to be included in this description.

The invention claimed is:

1. A method for configuration modifications of communication parameters in a communication link configured for functional safety between a first automation device and a second automation device, the method comprising:
   exchanging data from the first automation device to the second automation device and from the second automation device to the first automation device using a safety protocol;
   using the data as process output data or as process input data for a safety-critical process;
   running a first transmit-receive application on the first automation device, such that the first transmit-receive application, together with a first device driver, carries out a communication;
   running a second transmit-receive application on the second automation device, such that the second transmit-receive application, together with a second device driver, carries out the communication, wherein the first transmit-receive application and the second transmit-receive application, and the first device driver and the second device driver operate before a modification with a first set of communication parameters and after a modification with a second set of communication parameters;

sending, by the first automation device, a request for parameter modification to the second automation device;

responding, by the second automation device, to the request such that a standby acknowledgment of the request is sent, wherein an output process image is frozen, such that the process output data finally output on the second automation device is kept at a last value as a result of the output process image being frozen;

carrying out the modification of the communication parameters for the second automation device;

responding, by the first automation device, such that after receiving the standby acknowledgement in the first automation device, the communication is immediately stopped and the modification to the communication parameters is carried out for the first automation device, wherein an input process image is frozen, such that the process input data finally present at the first automation device is kept at a last value; and restarting the communication when the modification of the communication parameters in the first automation device is concluded and sending new process output data as the output process image to the second automation device, wherein as a result of the sending of the new process output data as the output process image, the process output data finally output on the second automation device is replaced by updated process output data.

2. The method of claim 1, wherein the output process image is frozen and the modification of the communication parameters for the second automation device is carried out immediately with the transmission of the standby acknowledgment in the second automation device.

3. The method of claim 1, wherein with the transmission of the standby acknowledgement, a first timer with a first runtime is started in the second transmit-receive application, and the first timer is used to monitor whether the communication has been restarted by the first automation device within the first runtime and as a result new process output data has been sent as a new output process image to the second automation device and if this is the case, the second automation device then responds with a ready acknowledgement and stops the first timer.

4. The method of claim 1, wherein after receiving the standby acknowledgement in the first automation device, a second timer with a second runtime is started in the first transmit-receive application and the second timer is used to monitor whether the ready acknowledgement has been received within the second runtime.

5. The method of claim 4, wherein the ready acknowledgement comprises new process input data as a new input process image for the first automation device.

6. The method of claim 1, wherein the configuration modifications are configuration modifications in an industrial plant system for controlling a safety-critical process, and wherein as a result of the method, an uninterruptible plant operation is enabled during the configuration modifications.

7. The method of claim 1, further comprising:

forming a signature via the new communication parameters in addition to the sent new process output data after the restarting of the communication;

sending the signature to the second automation device; and comparing, in the second automation device, the sent signature with a signature formed in the second automation device via the new communication parameters.

8. The plant system of claim 7, wherein the second transmit-receive application has a first timer and is configured, at a time instant of transmission of the standby acknowledgement, to start the first timer and monitor whether the communication has been restarted by the first automation device within a first runtime.

9. An industrial plant system for controlling a safety-critical process, the industrial plant system comprising:

a first automation device and a second automaton device that are connected to one another via a fieldbus, wherein the first automation device includes a first transmit-receive application and a first device driver, and the second automation device includes a second transmit-receive application and a second device driver;

a configuration system configured to:
 configure the first transmit-receive application and the second transmit-receive application, and the first device driver and the second device driver with a first set of communication parameters; and
 for a modification, configure the first transmit-receive application and the second transmit-receive application, and the first device driver and the second device driver with a second set of communication parameters, wherein the first automation device is configured to:
 obtain a request for a parameter modification from the configuration system; and
 send the request for the parameter modification to the second automation device for parameter modification purposes, wherein the second automation device is configured to:
 respond to the request, such that a standby acknowledgment of the request is sent; and
 immediately at a time instant of transmission of the standby acknowledgement:
  freeze an output process image, wherein the process output data finally output on the second automation device is kept at a last value as a result of the freeze of the output process image; and
  trigger the modification of the communication parameters for the second automation device, and wherein the first automation device is configured to:
 immediately stop the communication after receipt of the standby acknowledgment in the first automation device;
 carry out the modification of the communication parameters for the first automation device; and
 freeze an input process image, wherein the process input data finally present on the first automation device is kept at a last value as a result of the freeze of the input process image, wherein after modification of the communication parameters in the first automation device has concluded, the communication is restartable, and new process output data is sendable as an output process image to the second automation device.

10. The plant system of claim 9, wherein the first transmit-receive application has a second timer and is configured, at a time instant of receipt of the standby acknowledgement, to start the second timer and monitor whether a ready acknowledgement is received within a second runtime.

11. The plant system of claim 9, wherein the first automation device and the first transmit-receive application are configured to form a signature via the new communication parameters after the restart of the communication in addition to the sent new process output data, and send the signature to the second automation device, wherein the second automation device is configured to compare the sent signature with a second signature formed in the second automation device via the new communication parameters, and wherein the second transmit-receive application is configured for the comparison and, on account of knowledge of the new communication parameters and the formation of a second signature, generate an expectation with respect to the new communication parameters, and when the expectation does not match, is configured to produce an error response, provide replacement values, or produce the error response and provide the replacement values.

\* \* \* \* \*

UNITED STATES PATENT AND TRADEMARK OFFICE
CERTIFICATE OF CORRECTION

| | | |
|---|---|---|
| PATENT NO. | : 11,307,552 B2 | Page 1 of 1 |
| APPLICATION NO. | : 16/513688 | |
| DATED | : April 19, 2022 | |
| INVENTOR(S) | : Herbert Barthel et al. | |

It is certified that error appears in the above-identified patent and that said Letters Patent is hereby corrected as shown below:

On the Title Page

Column 1, Foreign Application Priority Data (30):
"8183956"
Should be replaced with:
"18183956"

Signed and Sealed this
Eleventh Day of October, 2022

Katherine Kelly Vidal
*Director of the United States Patent and Trademark Office*